United States Patent
Seshadri et al.

(10) Patent No.: US 11,755,588 B2
(45) Date of Patent: Sep. 12, 2023

(54) REAL-TIME DASHBOARDS, ALERTS AND ANALYTICS FOR A LOG INTELLIGENCE SYSTEM

(71) Applicant: VMWARE, INC., Palo Alto, CA (US)

(72) Inventors: Karthik Seshadri, Bangalore (IN); Siddartha Laxman Karibhimanvar, Bangalore (IN); Ritesh Jha, Bangalore (IN); Radhakrishnan Devarajan, Bangalore (IN); Chaitanya Krishna Mullangi, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 61 days.

(21) Appl. No.: 16/807,187

(22) Filed: Mar. 3, 2020

(65) Prior Publication Data
US 2021/0182297 A1    Jun. 17, 2021

(30) Foreign Application Priority Data

Dec. 11, 2019    (IN) .............................. 201941051280

(51) Int. Cl.
| | | |
|---|---|---|
| *G06F 16/2455* | (2019.01) | |
| *G06F 16/23* | (2019.01) | |
| *G06F 16/25* | (2019.01) | |
| *G06F 16/27* | (2019.01) | |
| *G06F 16/26* | (2019.01) | |

(52) U.S. Cl.
CPC .... *G06F 16/24568* (2019.01); *G06F 16/2379* (2019.01); *G06F 16/252* (2019.01); *G06F 16/26* (2019.01); *G06F 16/278* (2019.01)

(58) Field of Classification Search
None
See application file for complete search history.

(56) References Cited

U.S. PATENT DOCUMENTS

| | | | | |
|---|---|---|---|---|
| 2008/0208910 | A1* | 8/2008 | MacIntyre | G06Q 10/0637 |
| 2013/0042156 | A1* | 2/2013 | Srinivasan | G06F 11/2074 |
| | | | | 714/54 |
| 2014/0317448 | A1* | 10/2014 | Rash | G06F 11/1438 |
| | | | | 714/15 |
| 2015/0154288 | A1* | 6/2015 | Kim | G06F 16/35 |
| | | | | 707/737 |
| 2018/0203744 | A1* | 7/2018 | Wiesmaier | G06F 9/505 |
| 2021/0117232 | A1* | 4/2021 | Sriharsha | G06F 16/256 |

OTHER PUBLICATIONS

Ron Trunk et al., Difference between control plane, data plane and management plane? Feb. 3, 2017, stackexchange.com, https://web.archive.org/web/20170204080550/https://networkengineering.stackexchange.com/questions/38573/difference-between-control-plane-data-plane-and-management-plane.*
EsperTech Inc., Esper Reference Version 8.3.0, 2019, EsperTech.com., 984 pages.*
History [date unknown], Espertech.com, https://www.espertech.com/news/#:~:text=September%2019%202019%20%2D%20Release%208.3,0%20%2D%20Support%20JSON%20events.*

* cited by examiner

*Primary Examiner* — Jensen Hu
(74) *Attorney, Agent, or Firm* — DLA PIPER LLP (US)

(57) ABSTRACT

This disclosure describes how data supporting real-time reporting services can be cached during a log intake process. In particular, instead of caching all the log data being generated by an operational system, only the log data relevant to existing queries associated with the real-time reporting services are cached. In some embodiments, only particular metrics contained within the log data are stored for rapid access by the real-time reporting services.

18 Claims, 6 Drawing Sheets

REAL-TIME DASHBOARDS, ALERTS AND ANALYTICS FOR A LOG INTELLIGENCE SYSTEM

RELATED APPLICATIONS

Benefit is claimed under 35 U.S.C. 119(a)-(d) to Foreign Application Serial No. 201941051280 filed in India entitled "REAL-TIME DASHBOARDS, ALERTS AND ANALYTICS FOR A LOG INTELLIGENCE SYSTEM" on Dec. 11, 2019, by VMWARE, Inc., which is herein incorporated in its entirety by reference for all purposes.

FIELD

The present disclosure relates generally to caching specific datasets for populating and allowing quick updates of one or more real-time reporting services.

BACKGROUND

Log intelligence systems serve the distinct purpose of providing actionable insights from time-stamped events generated by multiple systems. Some capabilities of log intelligence systems include: ingestion of high volumes of data at high throughput; parsing and routing the data to a storage layer where it can be indexed; and providing user-facing functionalities such as real-time queries, alerts, dashboards and analytics. These systems rely on querying indexed logs stored in a text indexing system to cater to most user-facing functionalities. Unfortunately, leveraging this method for triggering alerts, and generating dashboard analytics can be quite inefficient. This method becomes even less efficient when the indexed logs are distributed across different shards. For this reason, methods of driving real-time reporting services such as dashboards and alerts with non-indexed data is desirable.

SUMMARY

This disclosure describes ways in which data supporting real-time dashboard services can be cached during a log intake process. Systems and methods for filtering and storing data pertinent to queries supporting the dashboard services during the log intake process are described.

A computer implemented method for displaying metrics associated with log data is described and includes: receiving a stream of log data being generated by an operational system; forwarding the stream of log data to a first data plane and to a constraint plane; storing the stream of log data in the first data plane; extracting a subset of the stream of log data at the constraint plane in accordance with a set of rules based on predefined queries of a real-time reporting service; saving the subset of the stream of log data to a second data plane; transmitting one or more metrics included in the subset of the stream of log data to the real-time reporting service; and providing the one or more metrics from the subset of the stream of log data to a user of the real-time reporting service.

A non-transitory computer-readable storage medium is described. The computer readable storage medium includes instructions configured to be executed by one or more processors of a computing device and to cause the computing device to carry out steps that include: receiving a stream of log data being generated by an operational system; forwarding the stream of log data to a first data plane and to a constraint plane; storing the stream of log data in the first data plane; extracting a subset of the stream of log data at the constraint plane in accordance with a set of rules based on predefined queries of a real-time reporting service; saving the subset of the stream of log data to a second data plane; transmitting one or more metrics included in the subset of the stream of log data to the real-time reporting service; and providing the one or more metrics from the subset of the stream of log data to a user of the real-time reporting service.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
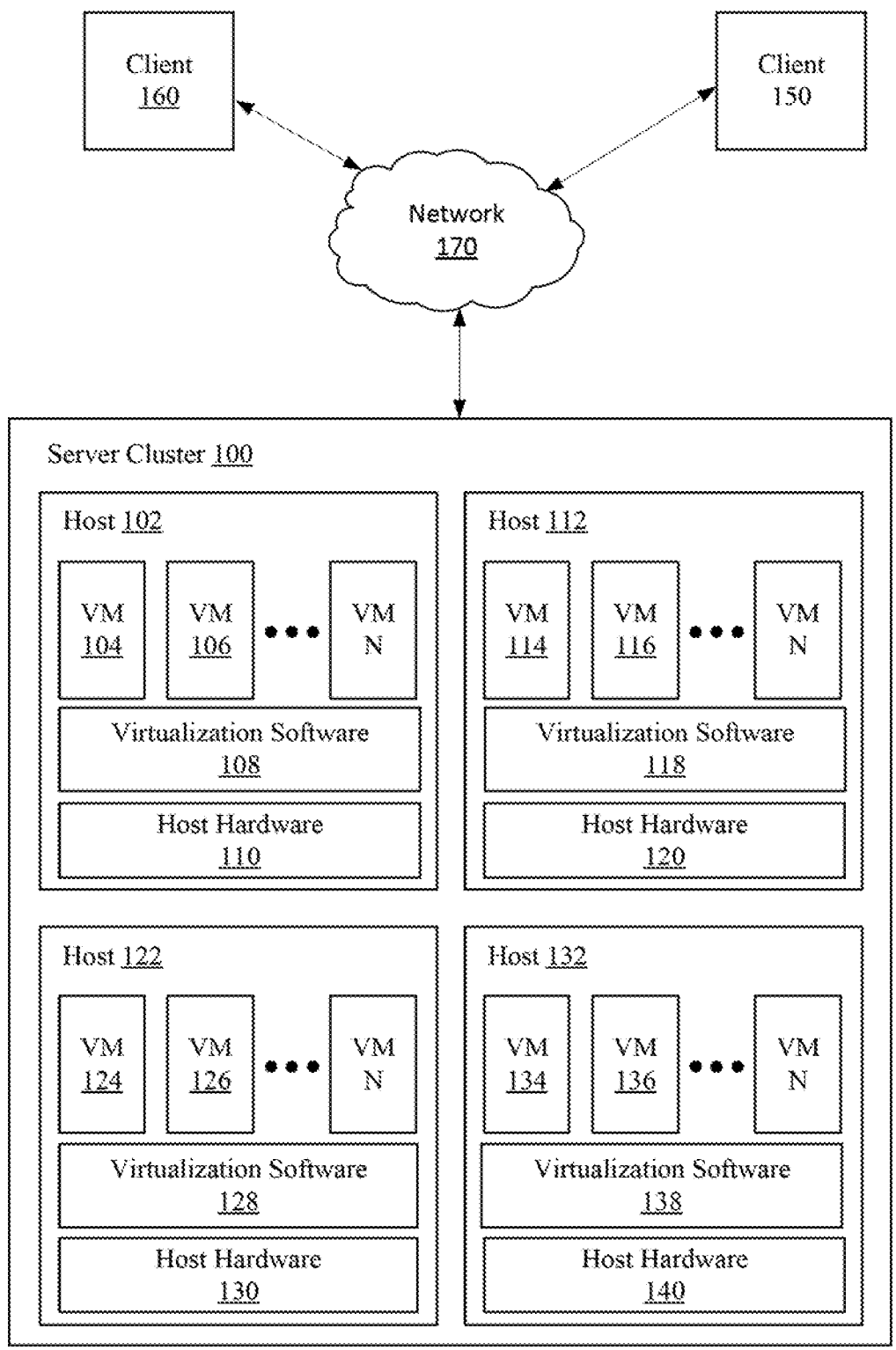
FIG. 1 shows a diagram illustrating an exemplary server cluster suitable for use with the embodiment described herein.

Certain details are set forth below to provide a sufficient understanding of various embodiments of the invention. However, it will be clear to one skilled in the art that embodiments of the invention may be practiced without one or more of these particular details. Moreover, the particular embodiments of the present invention described herein are provided by way of example and should not be used to limit the scope of the invention to these particular embodiments. In other instances, hardware components, network architectures, and/or software operations have not been shown in detail in order to avoid unnecessarily obscuring the invention.

The efficiency and performance of a log intelligence system can be negatively impacted when the system it analyzes produces a large number of logs. For example, when a user requests data from a primary data store for logs spanning a long period of time, the log intelligence system may need to analyze a large amount of data to retrieve the desired data to fulfill the user request. In a system having one or more queries supporting the display of a real-time dashboard and the reporting of alerts, one way to reduce the amount of time needed to run the one or more queries is to cache only the metrics needed to support the one or more queries.

One way to implement such a solution is to create an additional data store associated directly with an analytics engine of the log intelligence system that contains only a subset of the log data that is being produced by an operational system. This subset of log data can be stored at the additional data store as part of the log data ingestion process.

In this way, the subset of log data can be continuously updated with the most current log data generated by the operational system. In some embodiments, the subset of data does not include the entirety of pertinent log files but instead only includes specific metrics extracted from the pertinent log files. For at least this reason, an amount of data stored in the additional data store is substantially smaller than the amount of data stored in the primary data store. It should be appreciated that a size of the differential between the log data stored in the primary data store and the metric data stored in the additional data store can vary based on the scope and number of queries being run within the log intelligence system. Furthermore, having a dedicated data plane for supplying the metrics needed to retrieve desired dashboard visualizations and alerts also provides tangible benefits since background processes such as log data backup do not negatively affect the ability of the log intelligence system to provide rapid access to the desired data defined by the one or more queries.

These and other embodiments are discussed below with reference to FIGS. 1-6; however, those skilled in the art will readily appreciate that the detailed description given herein with respect to these figures is for explanatory purposes only and should not be construed as limiting.

FIG. 1 shows a block diagram illustrating an exemplary server cluster 100 suitable for use with the embodiment described in this disclosure. Server cluster 100 can include hosts 102, 112, 122 and 132. While a four host system is shown for exemplary purposes it should be appreciated that server cluster 100 could include a larger or smaller number of hosts. Each host 102-132 includes host hardware 110-140, which can include a designated amount of processing, memory, network and/or storage resources. In some embodiments, each of the hosts provide the same amount of resources, and in other embodiments, the hosts are configured to provide different amounts of resources to support one or more virtual machines (VMs) running on the hosts. Each of the VMs can be configured to run a guest operating system that allows for multiple applications or services to run within the VM.

Each of hosts 102, 112, 122 and 132 are capable of running virtualization software 108, 118, 128 and 138, respectively. The virtualization software can run within a virtual machine (VM) and includes management tools for starting, stopping and managing various virtual machines running on the host. For example, host 102 can be configured to stop or suspend operations of virtual machines 104 or 106 utilizing virtualization software 108. Virtualization software 108, commonly referred to as a hypervisor, can also be configured to start new virtual machines or change the amount of processing or memory resources from host hardware 110 that are assigned to one or more VMs running on host 102. Host hardware 110 includes one or more processors, memory, storage resources, I/O ports and the like that are configured to support operation of VMs running on host 102. In some embodiments, a greater amount of processing, memory or storage resources of host hardware 110 is allocated to operation of VM 104 than to VM 106. This may be desirable when, e.g., VM 104 is running a larger number of services or running on a more resource intensive operating system than VM 106. Clients 140 and 150 are positioned outside server cluster 100 and can request access to services running on server cluster 100 via network 160. Responding to the request for access and interacting with clients 140 and 150 can involve interaction with a single service or in other cases may involve multiple smaller services cooperatively interacting to provide information requested by clients 140 and/or 150.

Hosts 102, 112, 122 and 132, which make up server cluster 100, can also include or have access to a storage area network (SAN) that can be shared by multiple hosts. The SAN is configured to provide storage resources as known in the art. In some embodiments, the SAN can be used to store log data generated during operation of server cluster 100. While description is made herein with respect to the operation of the hosts 110-140, it will be appreciated that those of hosts 110-140 provide analogous functionality, respectively.

Figure 2:
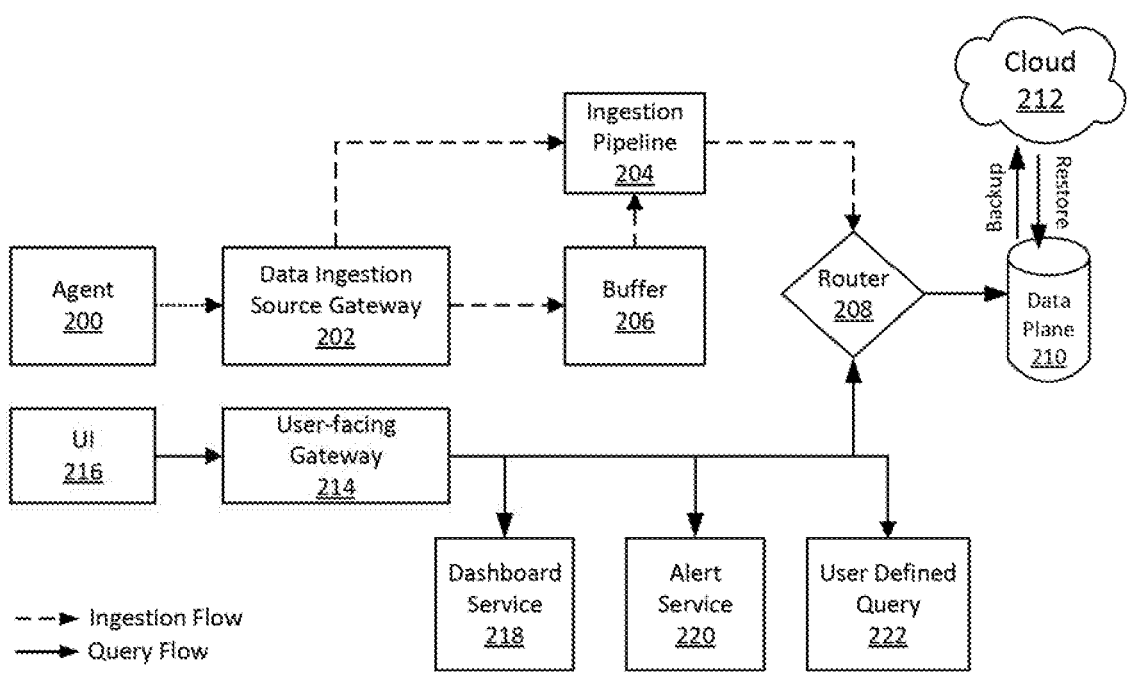
FIG. 2 shows a diagram illustrating an exemplary log intelligence intake process.

FIG. 2 shows a block diagram illustrating an exemplary log intelligence intake process. Agent 200 can be incorporated into many different types of environments (e.g., as a cloud infrastructure, an on premises infrastructure, or in a specific embodiment server cluster 100) to transmit log data that is generated in response to many different types of events to data ingestion source gateway 202. For example, agent 200 can generate logs stored in an events table that represent various events that are captured during normal or irregular operation of agent 200. The logs could include any number of metadata and a time stamp that helps to determine how often logs of particular types are generated. The metadata could be used to help identify whether the logs are related to detected errors or more normal activity such as a login or file download event Data ingestion source gateway 202 is configured to forward log data received from agent 200 to ingestion pipeline 204 and/or buffer 206. Log data received at ingestion pipeline 204 is then forwarded on to router 208, which distributes the log data to data plane 210. Log data can be sent to buffer 206 when a rate at which log data is being supplied by agent 200 exceeds a rate ingestion pipeline 204 can handle. In such a situation, buffer 206 can take the form of a Kafka module able to handle many extremely large streams of data. In some embodiments, the Kafka module can be configured to distribute multiple streams of the log data to separate computing resources to keep up with a rate at which the log data is being produced. Such a situation may arise when the system associated with agent 200 is undergoing high usage and/or experiencing large numbers of errors or warnings. Data plane 210 can be organized into multiple shards that improve reliability of the data store but may also limit a rate at which the stored log data can be retrieved. In some embodiments, the data logs can also be backed up to a cloud service 212. Cloud service 212 can provide access to the log data during an on premise server outage or be used to restore data lost due to equipment failure.

A user is able to retrieve relevant subsets of the log data from data plane 210 by accessing user-facing gateway 214 by way of user interface 216. Data representative of the log data is obtained by dashboard service 218, alert service 220 and user-defined query module 222. Dashboard service 218 is generally configured to retrieve log data from data plane 210 within a particular temporal range or that has a particular log type. Dashboard service 218 can include a number of predefined queries suitable for display on a dashboard display. Dashboard service 218 could include conventional queries that help characterize metrics such as error occurrence, user logins, server loading, etc. Alert service 220 can be configured to alter the user when the log data indicates a serious issue and user-defined query module 222 allows a user to define custom queries particularly relevant to operation of the application associated with agent 200.

With this type of configuration, dashboard service 218, alert service 220 and user-defined query module 222 each route requests for data to support the alerts and queries to data plane 210 by way of router 208. Queries are typically run to retrieve the entire dataset relevant to the query or alert in order to be sure time-delayed logs are not missed from the queries. In this way, the queries can be sure to obtain all data relevant to the query.

Figure 3:
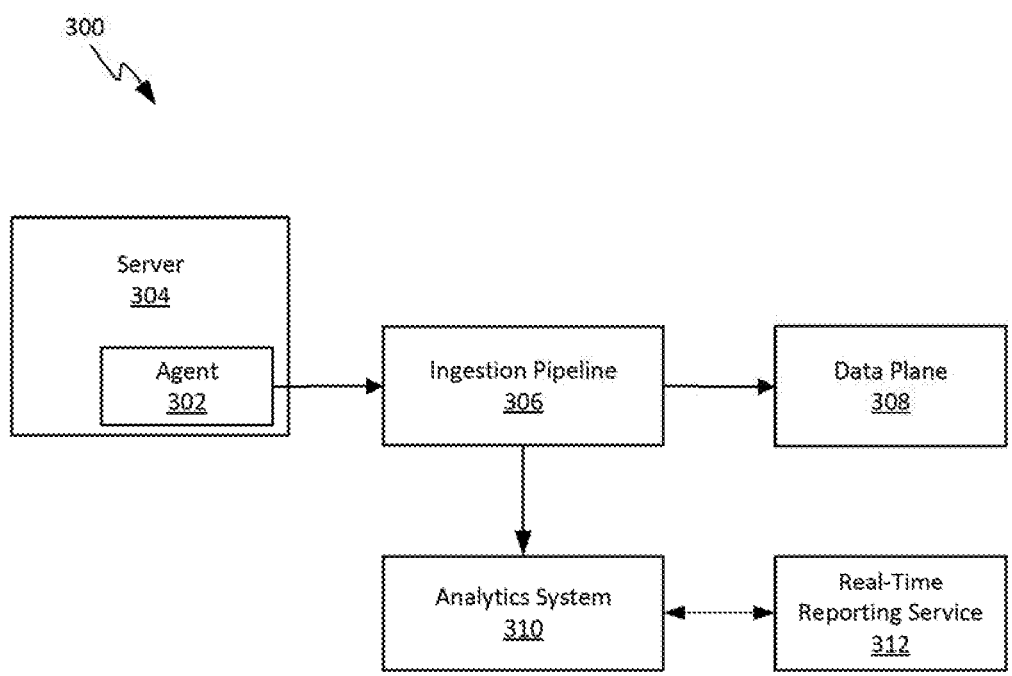
FIG. 3 shows a diagram illustrating another exemplary log intelligence system.

FIG. 3 shows a block diagram illustrating another exemplary log intelligence system 300. In particular, agent 302 can be installed within operational system 304 and configured to transmit a stream of log data generated by operational system 304 to ingestion pipeline 306. In some embodiments, the connection between agent 300 and the ingestion pipeline 302 can be a direct connection or alternatively be transmitted across a larger network. Ingestion pipeline 302 can be configured to perform basic formatting and parsing operations upon the log data prior to transmitting the log data to data plane 308. In some embodiments, the log data stored in data plane 308 can be backed up to other servers located on premises or at a number of distributed cloud computing facilities. Ingestion pipeline 306 can also be configured to provide data to analytics data storage 308. Analytics system 310 can include a robust set of filters that processes only the log data pertaining to a current set of metrics requested from real-time display system 310. For example, when processing the log data, any log data files failing to match one or more log data criteria can be discarded to save space and reduce access time to the log data stored on analytics data storage 308. In some embodiments, log data that is saved can be reduced in size by including only metrics currently being requested by real-time reporting service 312. Saving only a subset of the log data relevant to what is currently being used by the real-time reporting service during the data ingestion process allows for much more rapid performance of the log intelligence system. In some embodiments, the speed of real-time reporting service 312 is increased by at least an order of magnitude when compared with a configuration similar to the one depicted in FIG. 2.

Figure 4:
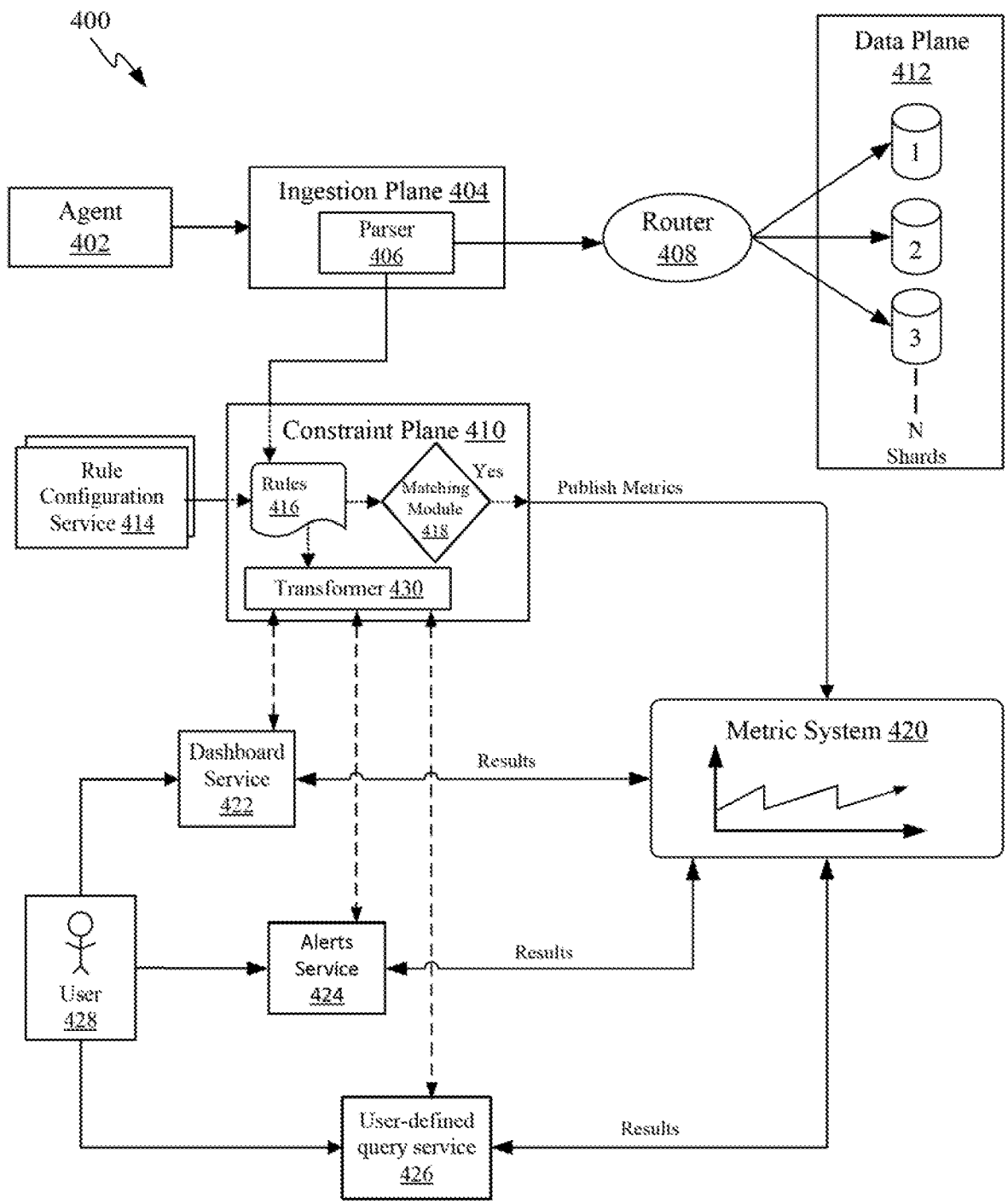
FIG. 4 shows a more detailed diagram illustrating another exemplary log intelligence system similar in function to the one described in FIG. 3

FIG. 4 shows a more detailed block diagram illustrating another exemplary log intelligence system 400 similar in function to the one described in FIG. 3. In particular, agent 402 is shown and as described above can be installed on an operational system. The operational system generates a stream of log data that is transmitted by agent 402 to ingestion plane 404. Ingestion plane 404 can optionally include a parser 406 that helps to identify the various types and locations of metrics included in the stream of log data. In a specific embodiments, parsing the log data can include the use of JSON parsing, followed by converting un-structured data to structured data using Grok parsers and the application of machine learning to improve the performance of the parsing. Parser 406 is configured to transmit the stream of log data to router 408 and to constraint plane 410. In some embodiments, parser 406 is configured to transmit the stream of log data to router 408 and to constraint plane 410 concurrently. Router 408 is responsible for distributing the stream of log data to data plane 412. In the depicted configuration data plane 412 includes multiple shards. In such a configuration router 408 can be configured to help distribute the stream of log data to each of the shards of data plane 412. Data can be organized in various manners within data plane 412. In some embodiments, log data can be stored temporally so that logs pulled within a particular time are distributed to a particular one of the shards. In some embodiments, the stream of log data is evenly distributed across each of the shards to improve intake time. Unfortunately, by distributing the log data across multiple shards in this manner, the performance of any queries is run against data plane 412 is reduced since the queries would have to be run against each of the shards containing the desired log data. As described in FIG. 2, log intelligence system 400 can include a buffer or Kafka module within ingestion plane 404 that is configured to process log data when the rate at which log data is provided overwhelms the system's ability to process it.

Ingestion plane 404 sends the same stream of log data to constraint plane 410 as it sends to router 408. In the depicted embodiment, rule configuration service 414 of constraint plane 410 is used to establish rules 416, which are derived from the queries supporting various reporting services. Rules 416 are then used to help identify which logs to extract from the stream of log data to display metrics of interest to an administrator or user of the operational system or to provide alerts when particular events occur at the operational system. In some embodiments, the displayed metrics are defined by developer-defined queries or queries built by users to fulfill a desired purpose. The alerts can be predefined by the developer and/or setup by a user who is able to change or update the queries associated with the alert service. A user interface can be configured to allow a user to subscribe to one or more alerts cued when the stream of log data indicates the occurrence of a particular event or sequence of events meeting an established criteria. The user interface also allows for the queries and/or alerts to be adjusted, added to or subtracted from.

Matching module 418 can be configured to process logs from a subset of the stream of log data that are determined to contain metrics matching rules 416. For example, an algorithm incorporated within matching module 418 and derived from rules 416 could be configured to perform a substring search on the stream of log data to identify logs that include certain keywords or terms such as error, login, critical and the like. In some embodiments, results from these substring searches could be used by matching module 418 to create one or more metrics, e.g., the number of errors or logins that have occurred over a particular period of time. The algorithm could also be configured to harvest text adjacent to or proximate to the searched for terms for the generation of other types of metrics. It should be noted that the matching module 418 can also employ non-string searches geared toward searching for particular attributes identified during the ingestion process.

Matching module 418 is then responsible for forwarding at least a portion of the subset of the stream of log data extracted from the log data to metric system 420. In some embodiments, this subset includes only logs with relevant metric data and in other embodiments, only the metric data is sent on to metric system 420. Metric system 420 can include its own data storage plane and take the form of a log analytics program such as Wavefront by VMWare®, which is able to catalog and organize the subset of the stream of log data. The log analytics program is configured to transmit the organized data to real-time reporting services such as, e.g., dashboard service 422, alert service 424 and user-defined query service 426. In some embodiments, communication between services 422, 424, 426 and metric system 420 are two-way communications that allow the different reporting services to request updated results at particular intervals and/or in particular formats. User 428 is able to request adjustments to dashboard service 422, alert service 424 and user-defined query service 426. As adjustments defined by users, these adjustments normally are expressed initially in the form of a log-based rule. For example, log-based rules are typically expressed in human-readable plain text whereas metric-based rules are configured to be read quickly and efficiently by computers and often contain additional metadata such as specific field names that might be defined during the parsing process. Services 422-426 can be configured to transmit log-based rules setup by user 428 to transformer 430. Transformer 430 can be configured to transform the log-based rules into metric-based rules formatted to be understood by metric system 420. In some embodiments, transformer 430 can also be configured to update metric-based rules 416 being implemented by matching module 418 based on log-based rules provided by services 422-426. The conversion of log-based rules to metric-based rules allows services 422-426 to efficiently communicate requests for new or updated information directly from metric system 420.

When the adjustment requests require historical data not already contained within metric system 420, a request can be sent to data plane 412 requesting the historical data be transferred to metric system 420. The transferred log data can pass through constraint plane 410 to extract portions of the requested log data entries that are not needed for the new query or alert. Since rules 416 are updated as part of this process, further data needed to update the new queries or alerts can be provided as part of the previously described data ingestion process so that no further data needs to be requested from data plane 412. Constraint plane 410 and metric system 420 can be collectively referred to as the analytics engine of log intelligence system 400 as these modules are responsible for identifying the relevant log data and providing structured data to the dashboard and alert services.

Figure 5A:
FIGS. 5A-5C show depictions of exemplary log data and how it can be modified as it is processed at the ingestion and constraint planes.
Figure 5B:
Figure 5C:

FIGS. 5A-5C show depictions of exemplary log data and how it can be modified as it is processed at the ingestion and constraint planes. In particular, FIG. 5A shows a depiction of exemplary log data 500 made up of multiple unstructured logs 501-503 prior to its arrival at ingestion plane 404. Other than the data being organized into different logs represented by logs 501-503 the data can be largely without structure. FIG. 5B shows how after log data 500 is processed by parser 406 numerous metrics including event time can be identified. Other examples of metrics contained within each of the logs includes event type. There can be numerous event types including, e.g., transaction logs, application logs, system logs, event logs and the like. An event type metric can be used to broadly separate out and filter one type of log from another. For example, a particular type of dashboard service might only be interested in tracking the number of application logs identifying critical errors over a particular period of time. Given such a situation, FIG. 5C shows how Log 502 can be discarded from the stream of log data at constraint plane 410 as either not being an application log or not being an application log directed to a critical error. One or more metrics can also be removed from each of the remaining logs by constraint plane 410 as depicted in FIG. 5C. In other embodiments, instead of saving logs from which unneeded metrics have been removed, the relevant metrics can instead be extracted from the logs. It should be appreciated that metric system 420 could also be configured to reduce a subset of logs that included the relevant metrics to just the relevant metrics themselves in order to streamline the amount of storage taken by the data and to improve metric access speeds.

For the critical error query described above, metrics such as user name, application name and other specific details about the error would not be needed to drive a dashboard visualization that only relates to the number of critical errors detected over a particular period of time. For a system in which the metrics were extracted by constraint plane 410 at least the event time, event type and event identifier would be extracted for each log referencing a critical error. It should be noted older log data can be retained by metric system 420 to allow a duration of queries to be adjusted rapidly if a user of the dashboard service decides to review different older periods of time. In some embodiments, the size reduction achieved by saving only metric data results in performance increases of greater than an order of magnitude compared with the configurations described in FIG. 2.

Figure 6:
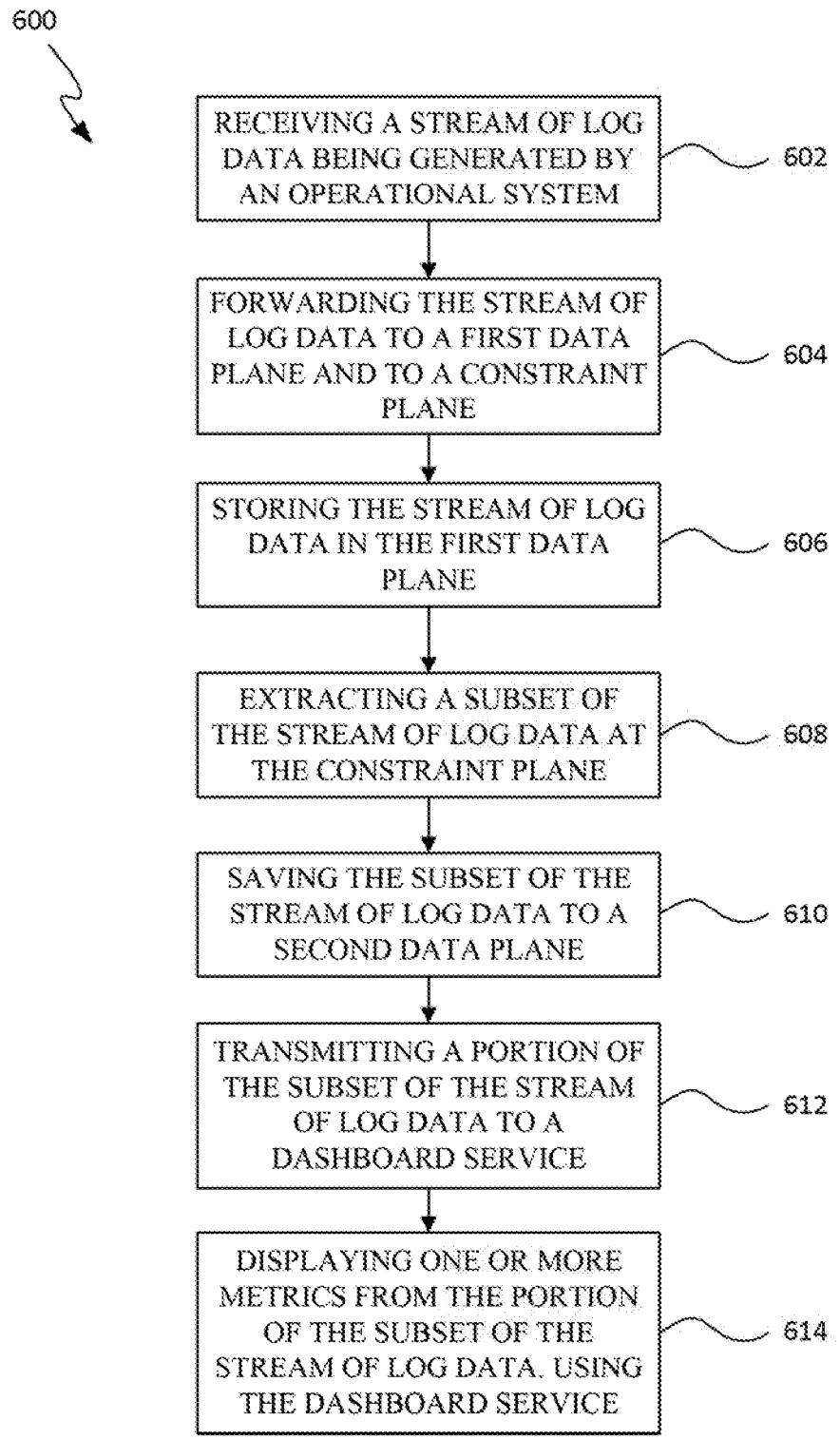
FIG. 6 shows a flow chart depicting a method for displaying metrics associated with log data.

FIG. 6 shows a flow chart 600 depicting a method for displaying metrics associated with log data. At 602, a stream of log data is received from an agent associated with an operational system. The agent can be installed or in communication with the operational system and configured to transmit the stream of log data generated by the operational system to the ingestion plane of a log intelligence product. At 604, the ingestion plane forwards the stream of log data to a first data plane and to a constraint plane. In some embodiments, the ingestion plane can include a parsing module that identifies metrics stored within the stream of log data prior to forwarding the stream of log data. At 606, the stream of log data is saved within the first data plane. The first data plane can be formed from a number of shards across which the stream of log data can be distributed. At 608, a subset of the stream of log data is extracted to reduce a size of the stream of log data to a more manageable size. On average, operational systems can generate millions of logs in a 24 hour period, making a subset more manageable and quicker to access. At 610, the subset of the stream of log data is saved to a second data plane. The data plane can be a component of a log analytics program configured to organize and distribute the subset of the stream of log data to one or more real-time reporting services. At 612, a portion of the subset of the stream of log data is transmitted to a dashboard service. Other portions of the subset of the stream of log data can be transmitted to other services such as an alert service or a user-defined query service. At 614, the portion of the subset of the stream of data is used to display one or more metrics to a user of the log intelligence product. Because the stream of data stored at the second data plane is much smaller than the stream of data located at the first data plane and not distributed across multiple shards, an amount of time needed to access the data can be substantially smaller than the time needed to query the stream of data stored in the first data plane.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computer implemented method for displaying metrics associated with log data, the computer implemented method comprising:
  receiving a first stream of log data being generated by an operational system;
  forwarding a second stream of log data to a first location and a third stream of log data to a second location separate and distinct from the first location, wherein the second and third streams of log data are forwarded to the first location and to the second location concurrently and each of the second and third streams of log data include data describing each log contained in the first stream of log data;

storing the second stream of log data forwarded to the first location;

extracting a subset of the third stream of log data forwarded to the second location at the second location in accordance with a set of rules based on predefined queries of a real-time reporting service;

storing the subset of the third stream of log data at a third location separate and distinct from the first and second locations;

transmitting one or more metrics included in the subset of the third stream of log data to the real-time reporting service; and providing the one or more metrics from the subset of the third stream of log data to a user of the real-time reporting service.

2. The computer implemented method as recited in claim 1, wherein the real-time reporting service comprises a dashboard service.

3. The computer implemented method as recited in claim 2, wherein the one or more metrics are displayed graphically to the user with a graph illustrating the number of occurrences of an event type over a predefined period of time.

4. The computer implemented method as recited in claim 1, wherein providing the one or more metrics from the subset of the third stream of log data to a user comprises sending an alert to a subscriber of an alert service when the one or more metrics indicate a predefined threshold has been exceeded.

5. The computer implemented method as recited in claim 1, wherein the subset of the third stream of log data comprises only the logs from the third stream of log data that include the one or more metrics.

6. The computer implemented method as recited in claim 5, wherein extracting the subset of the third stream of log data further comprises processing the subset of the third stream of log data to generate the one or more metrics and saving the subset of the third stream of log data comprises saving the one or more metrics to a third location.

7. The computer implemented method as recited in claim 1, wherein the first stream of log data is the same as the second stream of log data and the second stream of log data is the same as the third stream of log data.

8. The computer implemented method as recited in claim 1, wherein the first location comprises a plurality of shards and the second stream of log data is distributed across the plurality of shards.

9. The computer implemented method as recited in claim 1, wherein the first stream of log data is parsed to create the second stream of log data and the second stream of log data is the same as the third stream of log data.

10. The computer implemented method as recited in claim 1, wherein the subset of the third stream of log data includes only metric data.

11. The computer implemented method as recited in claim 1, further comprising requesting new metrics stored in the second location in response to receiving a user request to update one or more queries associated with the reporting service.

12. The computer implemented method as recited in claim 11, further comprising updating rules associated with the second location to match the requested update to the one or more queries.

13. The computer implemented method as recited in claim 12, further comprising requesting historical data from the first location when metrics requested by the one or more queries are not stored at the third location.

14. The computer implemented method as recited in claim 13, further comprising sending the historical data from the first location to the second location.

15. The computer implemented method as recited in claim 14, further comprising extracting one or more metrics from the historical data provided by the first location at the second location.

16. The computer implemented method as recited in claim 15, further comprising:

saving the one or more metrics at the third location; and transmitting the one or more metrics to the reporting service.

17. A non-transitory computer-readable storage medium storing instructions configured to be executed by one or more processors of a computing device cause the computing device to carry out steps that include:

receiving a first stream of log data being generated by an operational system;

forwarding a second stream of log data to a first location and a third stream of log data to a second location separate and distinct from the first location, wherein the second and third streams of log data are forwarded to the first location and to the second location concurrently and each of the second and third streams of log data include data describing each log contained in the first stream of log data;

storing the second stream of log data forwarded to the first location;

extracting a subset of the third stream of log data forwarded to the second location at the second location in accordance with a set of rules based on predefined queries of a real-time reporting service;

storing the subset of the third stream of log data at a third location separate and distinct from the first and second locations;

transmitting one or more metrics included in the subset of the third stream of log data to the real-time reporting service; and providing the one or more metrics from the subset of the third stream of log data to a user of the real-time reporting service.

18. A computer system, comprising:

one or more processors; and memory storing one or more programs configured to be executed by the one or more processors, the one or more programs including instructions for:

receiving a first stream of log data being generated by an operational system;

forwarding a second stream of log data to a first location and a third stream of log data to a second location separate and distinct from the first location, wherein the second and third streams of log data are forwarded to the first location and to the second location concurrently and each of the second and third streams of log data include data describing each log contained in the first stream of log data;

storing the stream of log data forwarded to the first location;

extracting a subset of the stream of log data forwarded to the second location at the second location in accordance with a set of rules based on predefined queries of a real-time reporting service;

storing the subset of the third stream of log data at a third location separate and distinct from the first and second locations;
transmitting one or more metrics included in the subset of the third stream of log data to the real-time reporting service; and
providing the one or more metrics from the subset of the third stream of log data to a user of the real-time reporting service.

* * * * *